United States Patent
Nakai et al.

(10) Patent No.: US 8,693,295 B2
(45) Date of Patent: Apr. 8, 2014

(54) OPTICAL DISC MEDIUM AND OPTICAL DISC DEVICE

(75) Inventors: Kenya Nakai, Tokyo (JP); Masahisa Shinoda, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1049 days.

(21) Appl. No.: 12/375,138

(22) PCT Filed: May 22, 2007

(86) PCT No.: PCT/JP2007/060402
§ 371 (c)(1),
(2), (4) Date: Mar. 26, 2009

(87) PCT Pub. No.: WO2008/012985
PCT Pub. Date: Jan. 31, 2008

(65) Prior Publication Data
US 2009/0303850 A1    Dec. 10, 2009

(30) Foreign Application Priority Data

Jul. 27, 2006    (JP) .................................. 2006-204037

(51) Int. Cl.
*G11B 7/00*        (2006.01)
(52) U.S. Cl.
USPC ..................................................... 369/44.26
(58) Field of Classification Search
None
See application file for complete search history.

(56) References Cited

U.S. PATENT DOCUMENTS

| | | | | | |
|---|---|---|---|---|---|
| 5,168,490 | A | * | 12/1992 | Braat ........................... | 369/275.1 |
| 5,754,506 | A | * | 5/1998 | Nagasawa et al. .......... | 369/275.4 |
| 5,805,551 | A | * | 9/1998 | Oshima et al. ................ | 705/57 |
| 5,838,658 | A | * | 11/1998 | Nakane et al. .............. | 369/275.4 |
| 6,556,537 | B1 | | 4/2003 | Endoh | |
| 6,683,832 | B2 | * | 1/2004 | Endoh ......................... | 369/275.4 |
| 6,760,299 | B1 | * | 7/2004 | Nakajima et al. ........... | 369/275.4 |
| 7,068,574 | B2 | * | 6/2006 | Oostveen et al. ........... | 369/275.3 |
| 2006/0250916 | A1 | | 11/2006 | Kikukawa et al. | |

FOREIGN PATENT DOCUMENTS

| | | |
|---|---|---|
| JP | S62-298935 | 12/1987 |
| JP | H03-116456 | 5/1991 |

(Continued)

OTHER PUBLICATIONS

Hiroshi Fuji et al., Japanese Journal of Applied Physics, vol. 43, No. 7A, 2004, pp. 4212-4215.

(Continued)

*Primary Examiner* — Joseph Feild
*Assistant Examiner* — Parul Gupta
(74) *Attorney, Agent, or Firm* — Birch, Stewart, Kolasch & Birch, LLP.

(57) ABSTRACT

When using an optical disc medium that includes pit trains having their widths narrower than a diffraction limit, it is difficult to detect a tracking error signal and take a tracking-servo control while increasing pit density in a direction orthogonal to a pit-train extension direction. Information pit trains are arranged spirally or concentrically and formed in a structure in which their depths are changed periodically at a pitch radially along the optical disc medium, so that the tracking error signal can be obtained by push-pull detection of diffraction light from the structure.

14 Claims, 8 Drawing Sheets

(56) References Cited

FOREIGN PATENT DOCUMENTS

| | | | |
|---|---|---|---|
| JP | 2000-149331 | A | 5/2000 |
| JP | 2004-087073 | A | 3/2004 |
| JP | 2004-235259 | A | 8/2004 |
| JP | 2005-339795 | A | 12/2005 |
| KR | 10-1999-0048139 | A | 7/1999 |
| KR | 10-1999-0067899 | A | 8/1999 |

OTHER PUBLICATIONS

Hiroshi Fuji et al., Japanese Journal of Applied Physics, vol. 39, Part 1, No. 2B, 2000, pp. 980-981.
Kazuma Kurihara et al., Japanese Journal of Applied Physics, vol. 45, No. 2B, 2006, pp. 1379-1382.
Kazuma Kurihara et ai., 2006, IEEE Conference Proceedings, WB4, pp. 203-205.

* cited by examiner

OPTICAL DISC MEDIUM AND OPTICAL DISC DEVICE

TECHNICAL FIELD

The present invention relates to optical disc media and optical disc devices, especially to an optical disc media capable of enhancing data density and an optical disc device using the media.

BACKGROUND ART

Until now, increasing of the capacity of various optical discs has been realized in such a way that the size of light-condensing spot is reduced on a focal plane, by downsizing information pits formed on the disc tracks, as well as by adopting, for recording and playing back use, a laser beam with a shorter wavelength and an objective lens with a larger numerical aperture.

For example, in a CD (Compact Disc) system, the disc substrate serving as a light transmitting layer (a transparent cover layer and a spacer layer provided on an information recording layer, which are also called as a transparent substrate) is approximately 1.2 mm in thickness, the laser beam wavelength is approximately 780 nm, the numerical aperture (NA) of the objective lens is 0.45, and the recording capacity of the CD is 650 MB. Meanwhile, in a DVD (digital versatile disc), the disc substrate serving as its light transmitting layer is approximately 0.6 mm in thickness, the laser beam wavelength is approximately 650 nm, the NA is 0.6, and the recording capacity of the disc is 4.7 GB. In DVD, two substrates whose thickness is, for example, 0.6 mm are bond together to be used as a 1.2 mm-thickness disc.

In a higher-density BD (Blu-ray Disc), a large memory capacity over 23 GB has been realized using an optical disc with a thinner light transmitting layer of 0.1 mm, by adopting a laser beam wavelength of approximately 405 nm and a NA of 0.85.

In addition to the discs described above, in an HDDVD (high definition digital versatile disc), a large memory capacity over 18 GB has been realized by using an optical disc substrate which serves as light transmitting layer and whose thickness is 0.6 mm as thick as the DVD, and by adopting a laser beam wavelength of approximately 405 nm and a NA of 0.65. Moreover, optical disc technologies are expected to further increase the density higher than those described above.

One of the technologies for increasing data density on optical discs is a super-resolution technology by which recording marks or information pits are formed on an optical disc in a size smaller than the diffraction limit and by which data is played back from the marks or the pits formed on the optical disc.

Generally, in a playback method in which a light beam with a wavelength $\lambda$ is used and focused with a numerical aperture NA to produce a light spot, it is impossible to read data when a mark pitch (or a pitch for information pit trains) is less than or equal to $\lambda/(2 \times NA)$; therefore, the pitch is referred to as the diffraction limit. Assuming that a recording mark portion (an information pit portion) has the same length as a spacer portion within one pitch, the diffraction limit of the recording mark length (or the information pit length) is given as $\lambda/(4 \times NA)$.

A super-resolution technology applied for recording and playback includes, for example, a technique in which nonlinear absorbing material that changes the refractive index or transmittance according to the light intensity is used for the optical disc medium to record therein marks or information pits smaller than the diffraction limit using light with locally intensified distribution; and a technique in which metal plasmon effect or other light enhancement effect is additionally given to produce much highly intensified light in order to record marks or information pits smaller than the diffraction limit (for example, techniques described in Patent Document 1, Patent Document 2, Patent Document 3, Non-Patent Document 1, and Non-Patent Document 2).

An optical disc medium structure has been devised as another conventional technique (for example, Non-Patent Document 4) to further increase density in directions orthogonal (hereinafter, referred to as "radial direction") to track extending directions: information pits smaller than the diffraction limit are arranged as a group track, and diffracted light due to a radially oriented structure with periodically spaced group tracks of the small pits and approximately flat portions therebetween is detected in radial direction as a push-pull signal; thereby, controlling a light-condensing spot, using tracking error signals with respect to the group tracks obtained from the push-pull signal, to accurately track each of pit trains arranged within an interval of the diffraction limit and play back data of the desired small pits.

More specifically, a fundamental structure of the super-resolution optical disc comprises a disc substrate that is provided with small pits smaller than the diffraction limit and on which formed is a film of light-absorbing material causing super-resolution phenomena, such as Silver-Indium-Antimony-Tellurium (AgInSbTe). On the disc, three information-pit trains configured only with the small pits, form a group track, which is regarded as a track having a width broader than the diffraction limit. It has been reported (for example, in Non-Patent Document 4) that a tracking error signal can be obtained by detecting, as a push-pull signal, diffracted light due to the structure described above, and that in order to scan the three pit trains in the group track with a light-condensing spot, the light-condensing spot is moved onto a desired pit train by adding an electrical offset signal to the tracking error signal.

The conventional technique described above can record 1.5 times more densely than that without group tracks; however, in an optical disc medium including pit trains with their width narrower than the diffraction limit, it has been difficult to detect a tracking error signal and take tracking-servo control while further radially increasing its recording density on the optical disc medium.

Patent Document 1: Japanese Patent Laid-Open No. 2004-87073 (page 9, FIG. 1)

Patent Document 2: Japanese Patent Laid-Open No. 2004-235259 (pages 4-5, FIG. 1)

Patent Document 3: Japanese Patent Laid-Open No. 2005-339795 (page 12, FIG. 2)

Non-Patent Document 1: J.J.A.P. Vol. 43, No. 7A, 2004, pp. 4212-4215, "Observation of Eye Pattern on Super-Resolution Near-Field Structure Disk with write-Strategy Technique"

Non-Patent Document 2: J.J.A.P. Vol. 39, Part 1, No. 2B, 2000, pp. 980-981, "A Near-Field Recording and Readout Technology Using a Metallic Probe in an Optical Disk"

Non-Patent Document 3: J.J.A.P. Vol. 45, No. 2B, 2006, pp. 1379-1382, "High-Speed Fabrication of Super-Resolution Near-Field Structure Read-Only Memory Master Disc using PtOx Thermal Decomposition Lithography"

Non-Patent Document 4: ODS Proceedings, WB4, pp. 203-205, "Super-RENS ROM Disc with Narrow Track Pitch"

DISCLOSURE OF INVENTION

The present invention aims to solve a problem for increasing density of the optical disc medium describe above, especially for further increasing density in radial direction.

The present invention is to realize a density higher than that obtained by conventional arts by providing information pits arranged on approximately flat portions existing between group tracks of the optical disc medium described at the background art, and by detecting diffraction light due to the group tracks as a push-pull signal, to obtain a tracking error signal.

For an optical disc device playing back data from the optical disc medium according to the present invention, provided is a tracking control method for enabling the device to read out pit trains sequentially from an inner circumference to an outer one, or from an outer circumference to an inter one.

The optical disc medium according to the present invention includes information pit trains which are arranged spirally or concentrically and whose depths are changed periodically at a pitch in radial direction.

According to an optical disc medium and an optical disc device of the present invention, accurate tracking operations are realized to thereby play back data from or record data to high-density information pits smaller than the diffraction limit, which brings an effect that the optical disc medium can be played back data sequentially from an inner circumference to an outer one, or from an outer circumference to an inter one.

Figure 1:
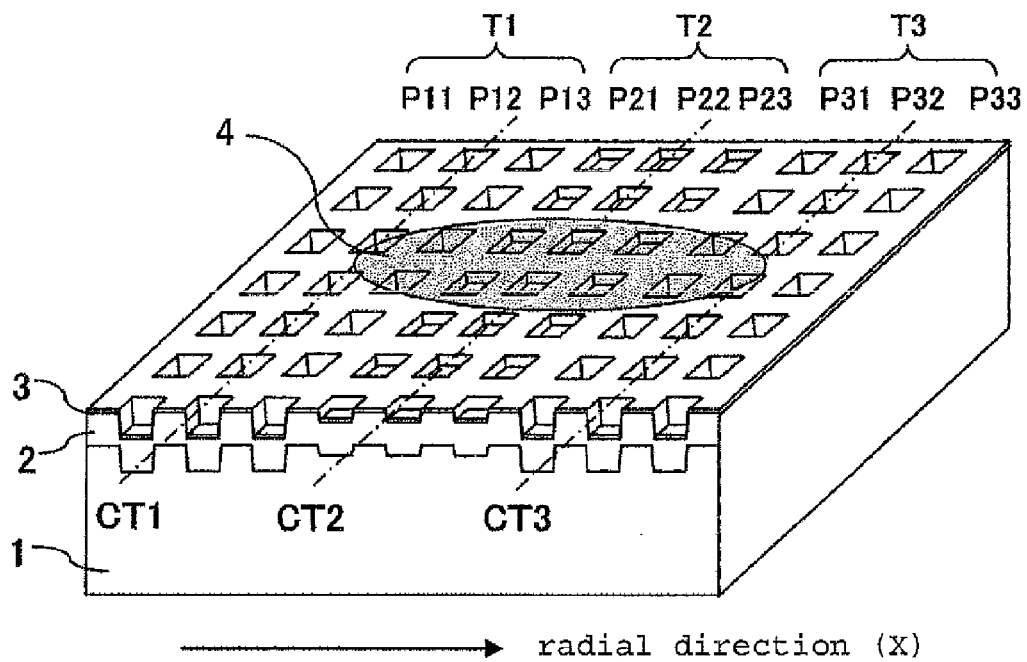
FIG. 1 is an enlarged perspective view that illustrates an information record surface of an optical disc medium of an embodiment according to the present invention.

REFERENCE NUMERALS 1 disc substrate
2 recording layer
3 super-resolution film
30 optical disc
31 optical head
32 system control unit
33 semiconductor laser
34 laser beam
35 collimation lens
36 beam splitter
37 objective lens
38 optical sensor
39 actuator
40 summing amplifier
41 waveform shaping unit
42 playback signal processing unit
43 differential amplifier
44 polarity controlling unit
45 tracking control unit
46 driving unit
47 address processing unit
48 traverse controlling unit
49 record signal processing unit
50 laser driving unit
51 spindle motor
52 driving unit

BEST MODE FOR CARRYING OUT THE INVENTION

Embodiment

An optical disc medium of the embodiment according to the present invention will be explained with reference to the figures.

FIG. 1 is an enlarged perspective view that illustrates an information record surface of an optical disc medium of the embodiment according to the present invention. A reference number 1 represents a disc substrate, a reference number 2 represents a recording layer, and a reference number 3 represents a super-resolution film for causing super-resolution phenomena. The super-resolution film 3 has a nonlinear characteristic to light intensity and is made of a light-absorbing material that changes its refractive index or transmittance by light with an intensity higher than or equal to a predetermined threshold value. As is described, for example, in Patent Document 1 or Patent Document 2, super-resolution phenomena occur by using, as the super-resolution film 3, light-absorbing material composed of Sb (antimony), Te (tellurium) or a compound including Sb and Te, or a metal oxide such as ZnO, $SnO_2$, $TiO_2$, and $Ta_2O_3$ described in Patent Document 3. As is described in Non-Patent Document 1 and Non-Patent Document 2, typical material of them are AgInSbTe, GeSbTe and the like. As for a material for the super-resolution film 3, a nonlinear material causing surface plasmon phenomena or other light enhancement phenomena may be used. By forming local areas each of which sizes is smaller than or equal to the diffraction limit at which light intensify is greater than or equal to the predetermined value described above, a recording mark or information pit (smaller than or equal to the diffraction limit) that is provided on the optical disc medium can be played back.

Track groups T1, T2, and T3 each include information pit trains P11, P12, and P13, information pit trains P21, P22, and P23, and information pit trains P31, P32, and P33; then, the pit depth of a track group differs from that of its neighboring one.

Figure 2:
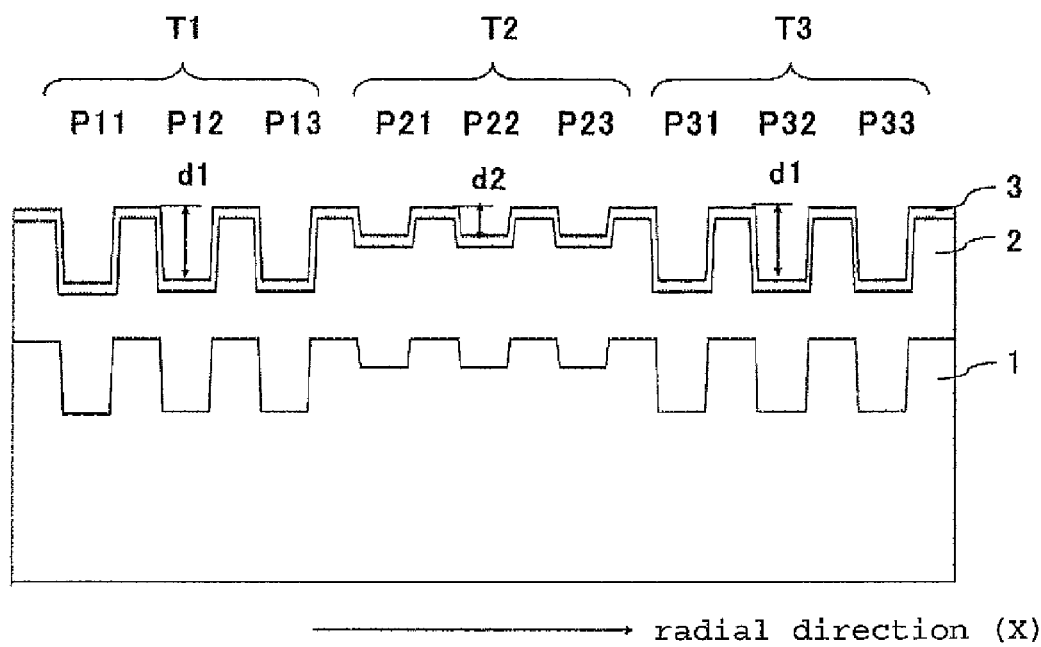
FIG. 2 is a cross-sectional view illustrating the structure of the optical disc medium of the embodiment according to the present invention.

FIG. 2 is a cross-sectional view illustrating the structure of the optical disc medium of the embodiment according to the present invention. FIG. 2 shows that the track groups T1 and T3 have the same pit depth d1, and the depth d2 of the track group T2 is set as a value different from the depth d1 with a relationship d1>d2.

For convenient sake, FIG. 1 shows only a portion cut out from an optical disc medium of the embodiment according to the present invention, illustrating that the track groups are structured so that their pit depths d1 and d2 appear periodically at a pitch in a direction indicated in the figure as radial direction (X). In addition, FIG. 1 and FIG. 2 show a minimum configuration for a lamination structure of the optical disc medium; and the disc medium may further be overlaid with a cover layer or a transparent layer to prevent chemical degradations and mechanical damages.

Dash and dotted lines CT1, CT2, and CT3 drawn in FIG. 1 each represent track centers of the track groups T1, T2, and T3, and the distance between the track centers CT1 and CT3 corresponds to a track group interval (a track group pitch).

Figure 3:
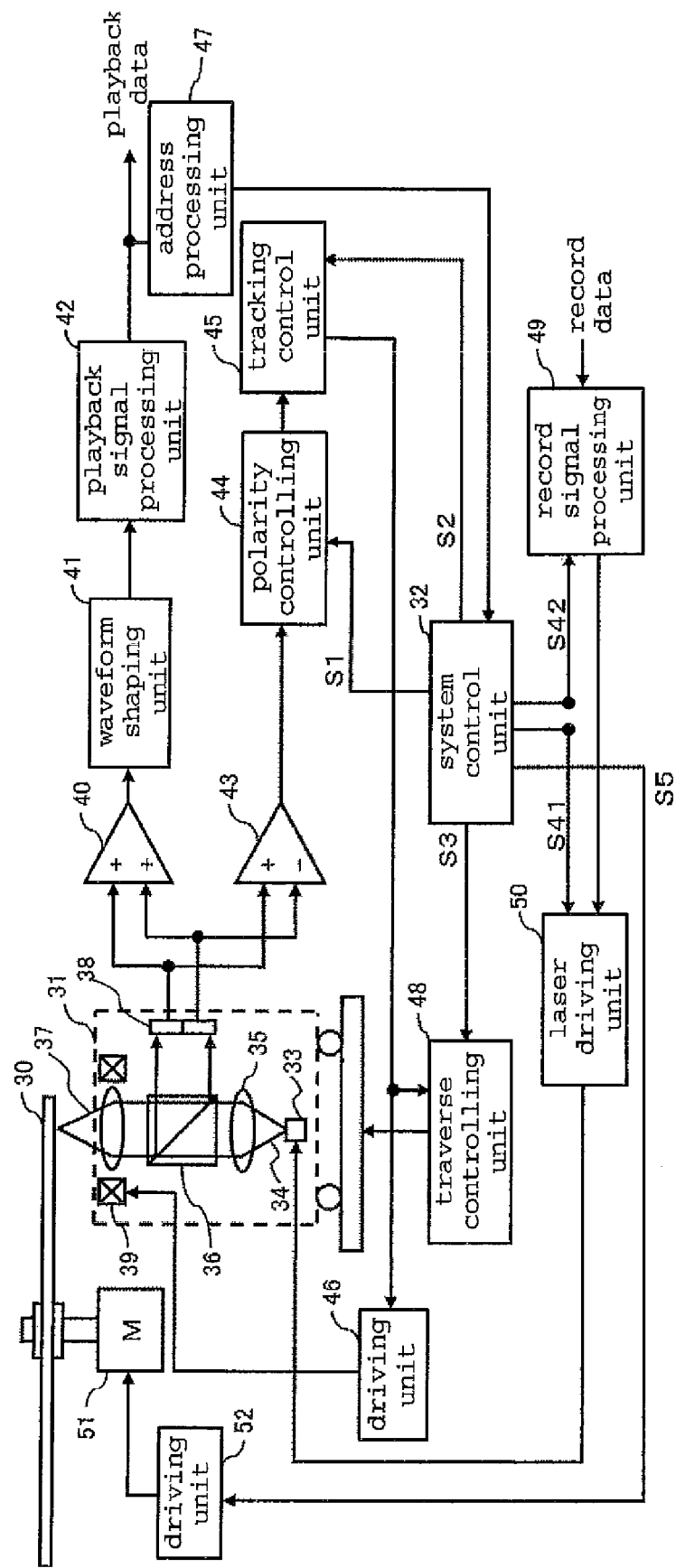
FIG. 3 is a block diagram illustrating the configuration of an optical disc device that plays back the optical disc medium of the embodiment according to the present invention.

Next, an optical disc device that plays back the optical disc medium of the embodiment according to the present invention will be explained. FIG. 3 is a block diagram illustrating a configuration of the optical disc device. The figure shows only the portions that concern the embodiment according to the present invention, and other components may be added. In FIG. 3, a reference number 30 represents an optical disc, and a reference number 31 represents an optical head. A system control unit 32 includes a programmable-command-operation function so that the unit controls the entire operations of the optical disc device. In the optical head 31, there are a semiconductor laser 33, a laser beam 34 emitted from the semiconductor laser, a collimation lens 35 for converting to a collimated light beam the laser beam 34 emitted from the semiconductor laser 33, a beam splitter 36, and an objective lens 37 for focusing on the optical disc 30 the laser beam 34 passing through the beam splitter 36 to form a light-condensing spot. An optical detector 38 receives light returning from the optical disc 30; and in order that the reflecting light is detected as a push-pull signal to obtain a tracking error signal, the detector includes light receiving faces that are divided into two faces by a dividing line in a direction in which tracks (track groups, pit trains) of the optical disc 30 are extending. An actuator 39 has a driving structure that freely drives the objective lens 37 in both directions of a direction orthogonal to the track extending direction (hereinafter, referred to as radial direction) and a direction perpendicular to an information recording face of the optical disc 30, more specifically, the optical axis direction of the objective lens 37 (hereinafter, referred to as a focusing direction).

A signal outputted from the optical detector 38 is inputted into a summing amplifier 40; a waveform shaping unit 41 intensifies modulated components of the outputted signal from an equalizer for easily transforming the outputted signal from the summing amplifier 40 into a digital signal; and a playback signal processing unit 42 corrects errors of the digital signal outputted from the waveform shaping unit 41 and demodulates the signal into playback data. Upon receiving the output signals from the optical detector 38, a differential amplifier 43 generates a tracking error signal as a push-pull signal; a polarity controlling unit 44 reverses the polarity of the tracking error signal on the basis of an output signal S1 from the system control unit 32. On the basis of an output signal S2 from the system control unit 32, a tracking control unit 45 can add an electrical offset signal to a tracking error signal processed by the polarity controlling unit 44. By inputting into a driving unit 46 for the actuator 39 a tracking error signal outputted from the tracking control unit 45, tracking-position control of a light-condensing spot that the objective lens 37 forms on the basis of the tracking error signal, is taken in radially along the optical disc 30. An address processing unit 47 extracts, from the playback data outputted from the playback signal processing unit 42, position information about the light-condensing spot on the optical disc 30, so as to send the position information (that is, address information) to the system control unit 32.

A traverse controlling unit 48 moves the optical head 31 radially along the optical disc 30 (that is, in radial direction) on the basis of the tracking error signal outputted from the tracking control unit 45 and an output signal S3 from the system control unit 32 so that information pits can be accessed from an inner circumference to an outer one. Record data is inputted into a record signal processing unit 49, which produces and outputs an emission pattern for the semiconductor laser 33 corresponding to the data; a laser driving unit 50 feeds a current through the semiconductor laser 33 in accordance with the emission pattern outputted from the signal processing unit 49, to make the conductor emit light.

When playing back the disc, a high-frequency current superposed at the laser driving unit is fed to the semiconductor laser 33 to make the laser emit light, resulting in reducing noise of the semiconductor laser 33. Then, in order that the super-resolution phenomena occur, as described above, the laser driving unit 50 controls the quantity of the light emitted from the semiconductor laser 33 so that the light intensity at the areas smaller than or equal to the diffraction limit is increased to be as high as or higher than a predetermined threshold value at which refractive index or transmittance of the super-resolution film 3 changes. The record signal processing unit 49 and the laser driving unit 50 are operated on the basis of output signals S41 and S42 outputted from the system control unit 32. When playing back the disc, the laser driving unit 50 is controlled on the basis of the output signal S41 so that the semiconductor laser 33 emits light and stops emitting light. When recording, a signal based on the output signal S42 is sent from the system control unit 32 to the record signal processing unit 49 so that a signal corresponding to data to be recorded is sent from the record signal processing unit 49 to the laser driving unit 50. The system control unit 32 also sends the output signal S41 to the laser driving unit 50, so that the semiconductor laser 33 can emit light modulated in accordance with the data to be recorded. A spindle motor 51 rotates the optical disc 30; a driving unit 52 controls rotation of the spindle motor 51. In accordance with the output signal S5 from the system control unit 32, the driving unit 52 changes rotation speed of the motor and starts and stops rotating the motor.

Figure 4A:
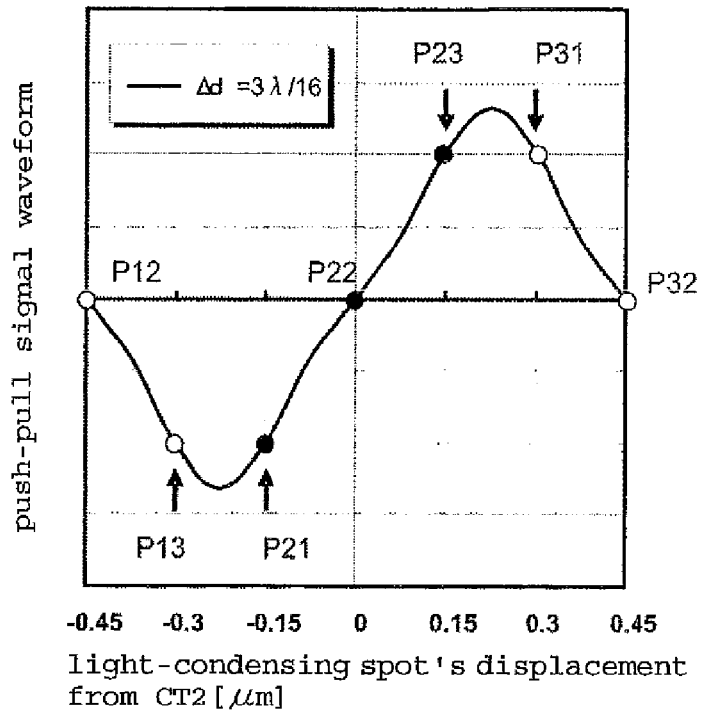
FIG. 4 shows an example of a simulation waveform with respect to a tracking error signal obtained from the optical disc medium of the embodiment according to the present invention.

FIG. 4A shows a simulation waveform of a tracking error signal detected as a push-pull signal by the differential amplifier 43 in the optical disc device shown in FIG. 3 when the light-condensing spot focused on the information recording surface of the optical disc medium shown in FIG. 1 and FIG. 2 is displaced radially along the optical disc medium (i.e., in the X direction).

Simulation condition for the tracking error signal waveform is that an application wavelength is $\lambda=405$ nm, a numerical aperture of the objective lens 37 is NA=0.85, and the small pit has a rectangular shape and is smaller than or equal to a diffraction limit (the diffraction limit is 0.119 μm ($=\lambda/(4\times NA)$). In addition to the condition, the size of the small pit is set as 0.075 μm×0.075 μm; and the distance between the pit centers next to each other is set to 0.15 λm, and the track group pitch is set to 0.9 μm.

Furthermore, a track group is set, similarly to the structure shown in FIG. 1 and FIG. 2, as three pit trains having its pit depths of $d1=6\lambda/8$ and $d2=2\lambda/16$. Here, the values of the pit depths d1 and d2 are determined, for further explanation from a viewpoint of light phases or phase differences, under an assumption that a substantial refractive index n of the light is one when the light passes through the transparent layer to reach and focus on the information recording surface. However, in a practical sense, the refractive index has a value equal to one or larger; then, practical pit depths have been set at values obtained by dividing said pit depths d1 and d2 by the refractive index n. The same goes for a pit depth difference Δd explained below.

In this simulation, the super-resolution film 3 is also regarded as a film that has a constant refractive index (in the simulation, it is assumed that the index is one), not varying with light intensity. This is because that areas where the super-resolution effects are produced are sufficiently smaller than that of the light-condensing spot and varied components in reflection light (so-called, RF signals) produced from the super-resolution-effect areas are cancelled by differential signal detection, which state negligibly contributes to the push-pull signal treated as an operation signal in the simulation.

Figure 4B:
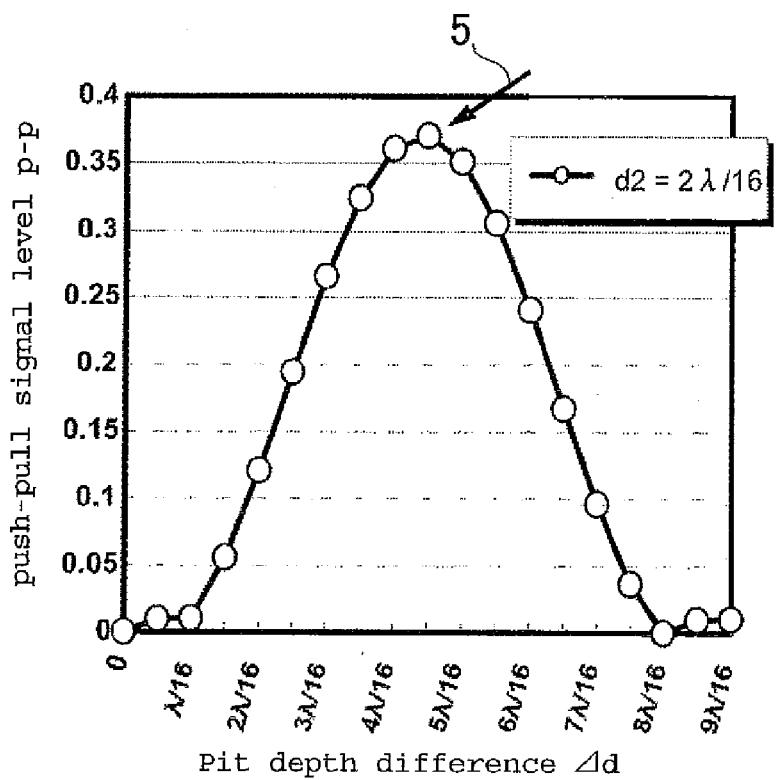

FIG. 4B is a simulation result, which shows amplitude changes in the tracking error signal in relation to the pit depth difference Δd (=d1−d2). In the simulation, the pit depth d2 is fixed as d2=2λ/16 and the pit depth d1 is changed. The result shown in FIG. 4B reveals that the push-pull signal level takes its maximum value when the pit depth difference Δd is approximately 4.5λ/16, so that setting the difference as approximately 3λ/16 through 6λ/16 can securely provide a high-level tracking error signal.

In a waveform of the tacking error signal shown in FIG. 4A, filled circles are servo-operation points for tracking control of the pit trains P21, P22 and P23 having their pit depth d2 and circles are points for tracking control of the pit trains P12, P13, P31, P32 having their pit depth d1. Therefore, when tracking control to a desired pit train is taken, the polarity controlling unit 44 performs polarity setting that makes directions of the servo operations coincide with inclination polarity of the tracking error signal at the servo-operation point, and the tracking control unit 45 performs adding operation of an electrical offset, realizing excellent tracking operations at each servo-operation point. These settings of the polarity and the offset are performed according to the address information extracted by the address processing unit 47.

As described above, even for discs having extremely narrow track pitches, the tracking method can realize an excellent tracking operation.

Next, a track format on the optical disc medium of an embodiment according to the present invention will be explained.

Figure 5:
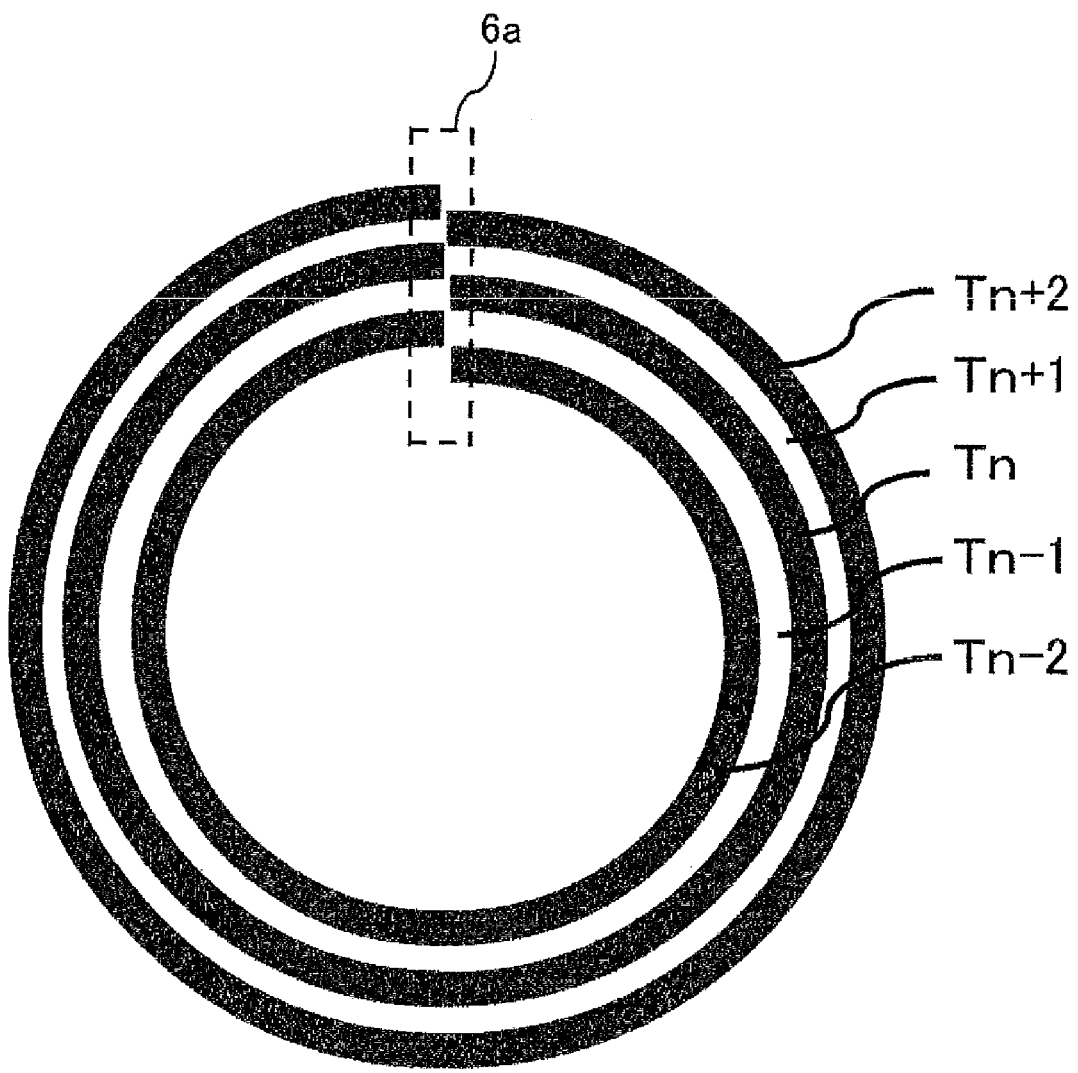
FIG. 5 is a plane view illustrating a track format of the optical disc medium of the embodiment according to the present invention.

FIG. 5 is a top view of a track format on the optical disc medium of an embodiment according to the present invention. A track format of spiral type is shown in FIG. 5, in which a track group is joined in a track switching portion 6a surrounded by a broken line to the neighboring track group having a different depth.

Figure 6:
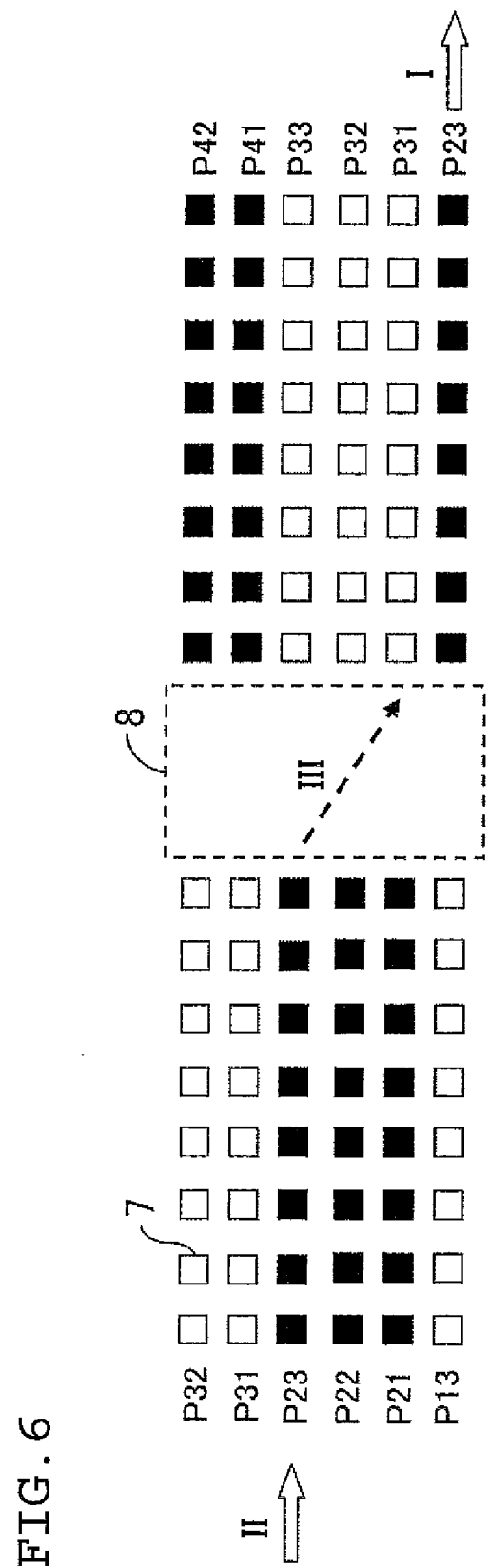
FIG. 6 is an enlarged view that illustrates a track switching portion in FIG. 5 showing a track format of the optical disc medium of the embodiment according to the present invention.

FIG. 6 is an enlarged illustration of the track switching portion 6a in FIG. 5. Square marks represent information pits 7. Using FIG. 6, will be explained a control method that controls, in relation to the track switching portion 6a, the tracking error signal shown in FIG. 4.

In a track switching portion 6a, surrounded by the broken line is a header area 8 which is provided for each pit train or each track group and has a concave-convex structure. Because the structure of the header area 8 is not an essential part of the present invention, its detail explanation will be omitted on purpose, provided that the structure enables the address processing unit 47, when the area is scanned with a light-condensing spot, to extract address information about where the light-condensing spot is positioned on the disc. The system control unit 32 processes the address information and then sends the next operation instruction to the tracking control unit 45. An example is explained as follows: after tracking the pit train P23 (a path I->a path II) by servo operation, the servo operation point is changed to the pit train P31 by, as described above, setting the polarity and the electrical offset at the track switching portion 6a; thus, the servo operation for tracking can be changed through a path III to track the pit train P31. By repeating the sequence of operations described above, data in all pit trains on the optical disc can be played back sequentially from an inner circumference to an outer one, or from the outer inner circumference to the inner one.

Figure 7:
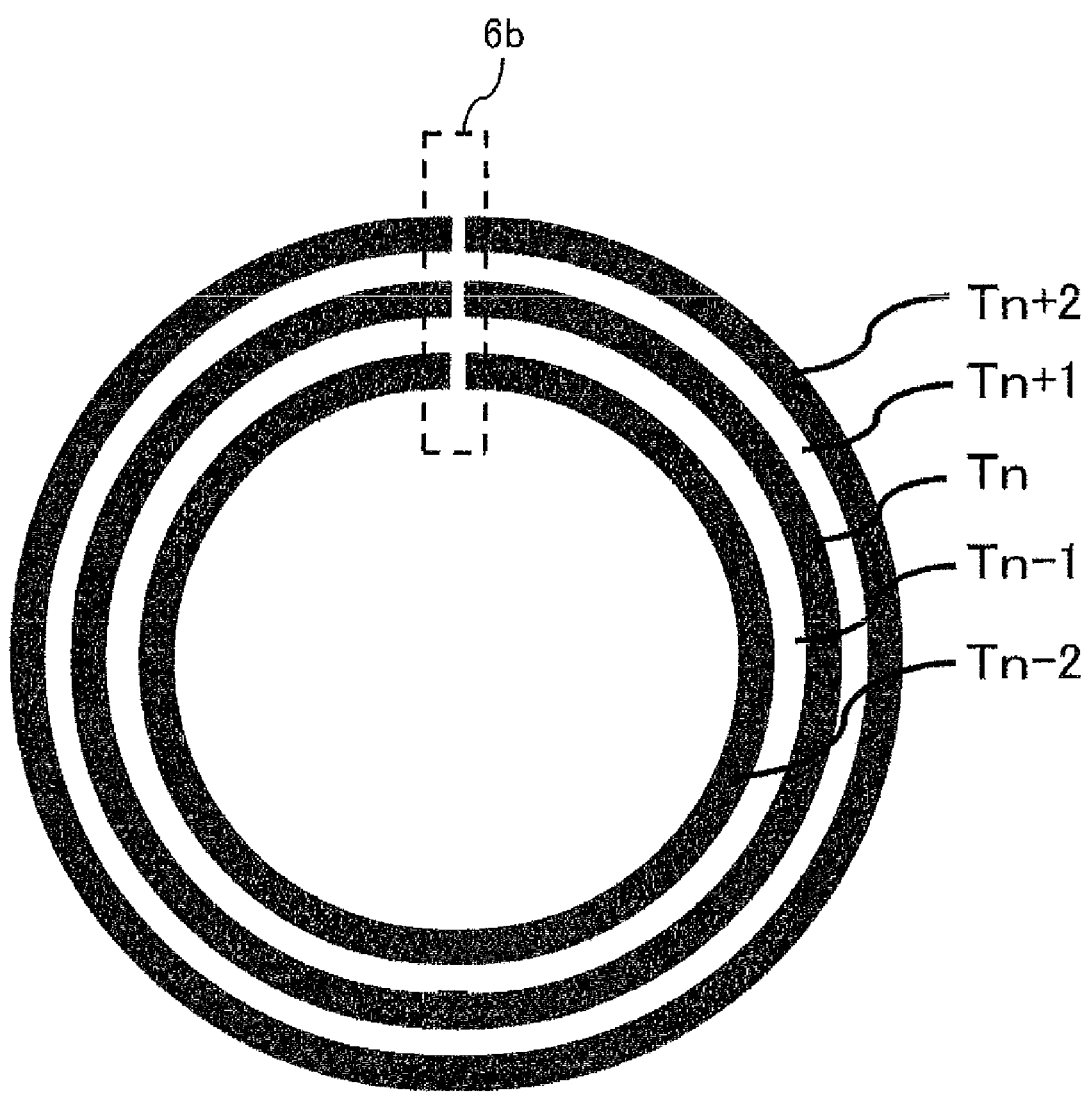
FIG. 7 is a plane view illustrating another track format of the optical disc medium of the embodiment according to the present invention.
Figure 8:
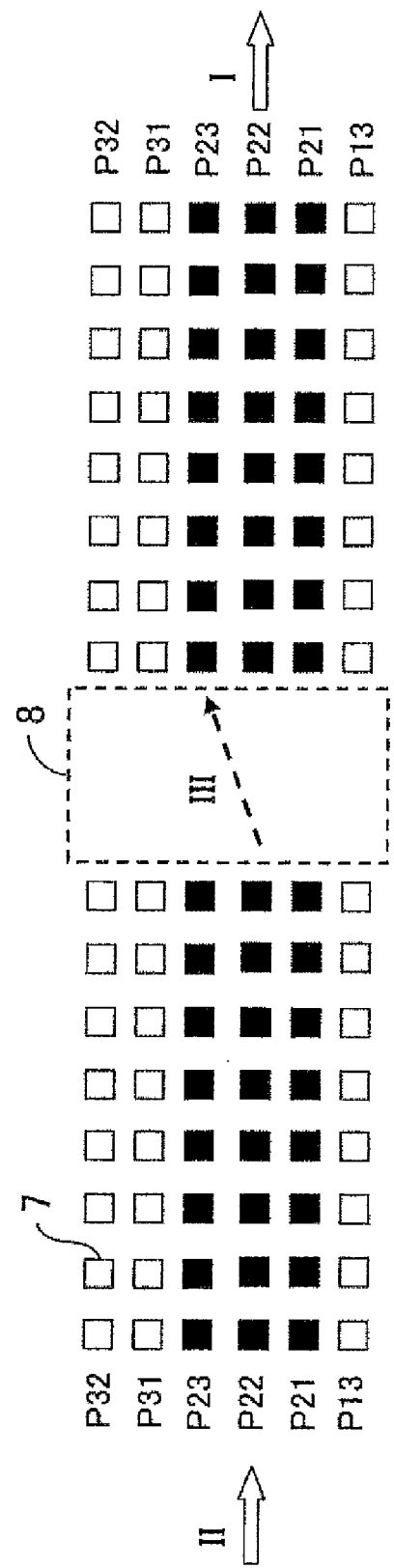
FIG. 8 is an enlarged view that illustrates a track switching portion in FIG. 7 showing a track format of the optical disc medium of the embodiment according to the present invention.

FIG. 7 is a top view of another track format for the optical disc medium of the embodiment according to the present invention. FIG. 8 is an enlarged illustration of the track switching portion 6b in FIG. 7. Numerals expressed as the same ones as those in FIG. 6 are the same components or equivalent ones, so that their explanations will be omitted. Referring to FIG. 8, a method for controlling tracking error signal shown in FIG. 4 will be explained in relation to the track switching portion 6b. Similar to FIG. 6 described above, in a track switching portion 6b surrounded by the broken line is a header area 8 which is provided for each pit train or each track group and has a concave-convex structure. Because the structure of the header area 8 is not an essential part of the present invention, its detail explanation will be omitted on purpose, provided that the structure enables the address processing unit 47, when the area is scanned with a light-condensing spot, to extract address information about where the light-condensing spot is positioned on the disc. The system control unit 32 processes the address information and then sends the next operation instruction to the tracking control unit 45.

An example is as follows: after tacking the pit train P22 (a path I->a path II) by servo operation, the servo operation point is changed at the track switching portion 6b to the pit train P23 by, as described above, setting the polarity and the electrical offset; thus, the servo operation for tracking can be changed through a path III to track the pit train P23. By repeating the sequence of operations described above, data in all pit trains on the optical disc can be played back sequentially from an inner circumference to an outer one, or from the outer inner circumference to the inner one.

According to the track format shown in FIG. 8, the actuator that holds and moves the objective lens 37 can substantially move less, which brings a stable tracking servo operation.

Figure 9:
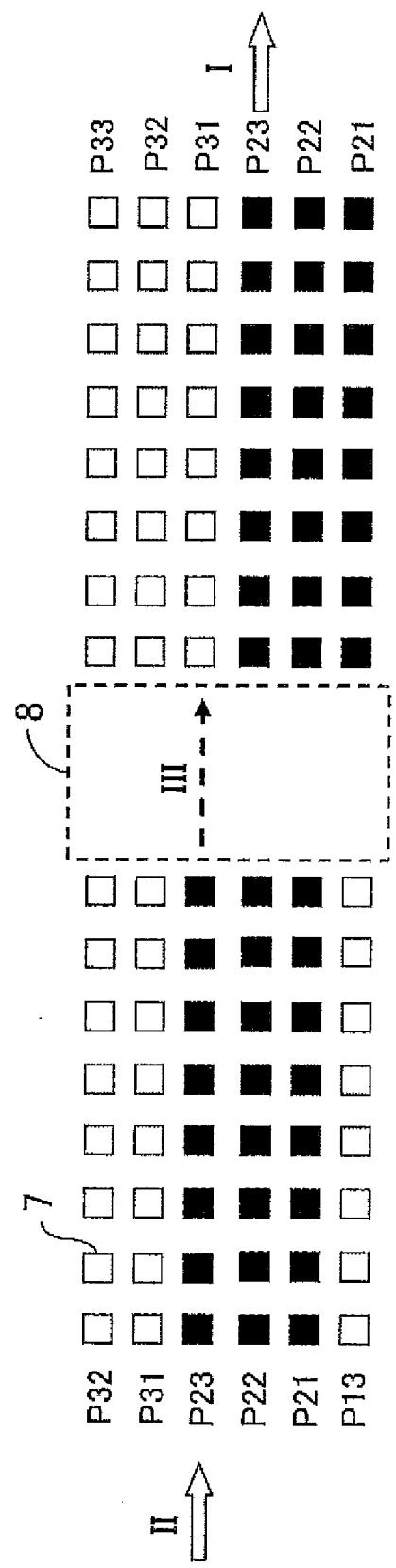
FIG. 9 is an enlarged view that illustrates a track switching portion in a modified track format of the optical disc medium of the embodiment according to the present invention.

FIG. 9 is an enlarged view of a track switching portion 6b of a track format modified from that shown in FIG. 7, of the optical disc medium of the embodiment according to the present invention. Numerals expressed as the same ones as those in FIG. 6 and FIG. 8 represent the same components or equivalent ones, so that their explanations will be omitted. Referring to FIG. 9, a method for controlling tracking error signal shown in FIG. 4 will be explained in relation to the track switching portion 6b. Similar to FIG. 6 described above, in a track switching portion 6b surrounded by the broken line is a header area 8 which is provided for each pit train or each track group and has a concave-convex structure. Because the structure of the header area 8 is not an essential part of the present invention, its detail explanation will be omitted on purpose, provided that the structure enables the address processing unit 47, when the area is scanned with a light-condensing spot, to extract address information about where the light-condensing spot is positioned on the disc. The system control unit 32 processes the address information and then sends the next operation instruction to the tracking control unit 45.

An example is as follows: after tacking the pit train P23 (a path I->a path II) by servo operation, the servo operation point is changed at the track switching portion 6b to the pit train P31 by, as described above, setting the polarity and the electrical offset; thus, the servo operation for tracking can be changed through a path III to track the pit train P31. By repeating the sequence of operations described above, data in all pit trains on the optical disc can be played back sequentially from an inner circumference to an outer one, or from the outer inner circumference to the inner one.

According to the track format shown in FIG. 9, the actuator that holds and moves the objective lens 37 substantially does not need to move, which brings a tracking servo operation more stable than that brought by the format shown in FIG. 8.

In the embodiments according to the present invention, the shape of the pit has been a rectangle, as shown in FIG. 1 and FIG. 2; however, the shape is not limited to that shape, it may be a circle, an ellipse or the like.

In FIG. 1 and FIG. 2, showing the embodiment according to the present invention, all information pits 7 have been equally spaced to be arranged, however, when information data are actually recorded, all of the pits are not necessarily needed; the information pits 7 may be randomly spaced in an array direction to be arranged, the array-direction lengths of the information pits 7 are not necessarily constant, and the lengths may vary according to record data and modulation methods.

When the array-direction length of any information pit 7 is made equal to or shorter than the diffraction limit, it is advantageous that interference from diffraction light supposed to occur by pits with their lengths equal to or longer than the diffraction limit can be avoided accordingly. If there is an optical system to be applied which can dissolve the above interference problem, it is obviously needless that the array-direction length of any information pit be made equal to or shorter than the diffraction limit.

Although the above explanation is made with the number of pit trains in a track group being three, the pit train number is not limited to thereto and it may be various number provided that each pit train has radially a width equal to or narrower than the diffraction limit and the pitch (or interval space) between the track groups is equal to or wider than the diffraction limit.

When the pitch (or interval space) between the track groups is made approximately 1.6 μm, approximately 0.74 μm, or approximately 0.34 μm, it becomes the same as the track pitch as that of existing CD, DVD, or BD, respectively, which can enhance compatibility on servo operations such as track jump operations, in optical disc systems.

In the embodiments according to the present invention, it has been described that each pit train includes pits whose shape are concave; however, the pit does not necessarily have a concave shape, it may be a "protrusion" in a convex shape. In this case, the pit depth difference Δd (=d1−d2) can be replaced with the height difference between the "protrusions". Furthermore, a track group has the "protrusions" in a convex shape but its neighboring track group may have the pits whose shapes are concave. In this case, the pit depth difference Δd (=d1−d2) is calculated as d1>0 and d2<0. In each of the cases, the concave-convex portions produce phase differences, which brings the same effects as the embodiments.

What is claimed is:

1. An optical disc medium comprising:
   a substrate; and
   a recording layer, the recording layer having a plurality of track groups, each track group having a plurality of adjacent information pit trains structured with information pits having the same pit depth and arranged circularly or spirally, wherein
   the information pit depth of the track groups changes periodically, at a group pitch, radially along the optical disc medium, and the information pit depth of adjacent track groups differ;
   the number of inforamtion pit trains forming each track group is identical to the number of information pit trains forming an adjacent track group, and
   the width of each of the information pits is less than or equal to a light-condensing spot's diffraction limit given λ/(4×NA) determined by a numerical aperture NA of an objective lens and a wavelength λ in use, as specifications of an optical disc device which records or plays back using the disc medium.

2. The optical disc medium according to claim 1, wherein the information pits include those having a length in the circular or spiral arrangement direction less than or equal to the light-condensing spot's diffraction limit given by λ/(4×NA).

3. The optical disc medium according to claim 1, wherein the group pitch is greater than or equal to a light-condensing spot's diffraction limit given by λ/(2×NA).

4. The optical disc medium according to claim 3, wherein the group pitch is one of approximately 0.32 μm, approximately 0.74 μm, and approximately 1.6μm.

5. The optical disc medium according to claim 1, wherein an optical disc substrate having the information pit structure is overlaid, in at least one layer, with a light-absorbing material whose optical transmittance characteristic is nonlinear with respect to light intensity.

6. The optical disc medium according to claim 5, wherein the light-absorbing material includes Sb or Te.

7. The optical disc medium according to claim 5, wherein the light-absorbing material includes at least one metal oxide of ZnO, $SnO_2$, $TiO_2$, and $Ta_2O_3$.

8. An optical disc device that records onto or plays back from an optical disc medium according to claim 1, comprising:
   an optical head, having an objective lens for focusing a laser beam to form a light-condensing spot on an optical disc medium; and
   an optical detector that receives light returning from the optical disc medium, the detector including light receiving faces that are divided by a dividing line in a direction which tracks information pit trains within track groups on the optical disc medium;
   wherein light intensity at a part of the light-condensing spot where the objective lens of the optical disc device focuses light on the optical disc medium is greater than or equal to a threshold value that makes the light-absorbing material produce super-resolution effect.

9. The optical disc medium according to claim 1, further comprising: a track switching section, at least at every one round of the optical disc medium, in which a header is provided including at least address information or tracking control information.

10. The optical disc medium according to claim 9, wherein at the track switching section each of the information pit trains is connected to the pit train shifted by half of the group pitch.

11. The optical disc medium according to claim 9, wherein at the track switching section, each of the information pit trains is connected to the pit train next to each train.

12. The optical disc medium according to claim 1, wherein a light phase difference caused by the change of the information pit depth is between approximately $2\lambda/16$ and approximately $6\lambda/16$.

13. The optical disc device according to claim 8, wherein the light receiving faces are divided by a dividing line parallel to a direction in which the information pits are at least circularly or spirally arranged, and the optical disc device takes tracking-position control of a light-condensing spot using a push-pull signal obtained through a differential calculation of electrical signals outputted from the light receiving faces.

14. The optical disc device according to claim 13, wherein by setting a polarity and an offset value for a tracking error signal corresponding to a position of the information pit train, tracking-servo operation points are switched over so that the light-condensing spot is controlled to be positioned to a desired information pit train.

* * * * *